April 9, 1957    R. A. VAN DE WALKER    2,788,064
MODEL AIRPLANE FUEL TANK CONTROL
Filed June 13, 1955
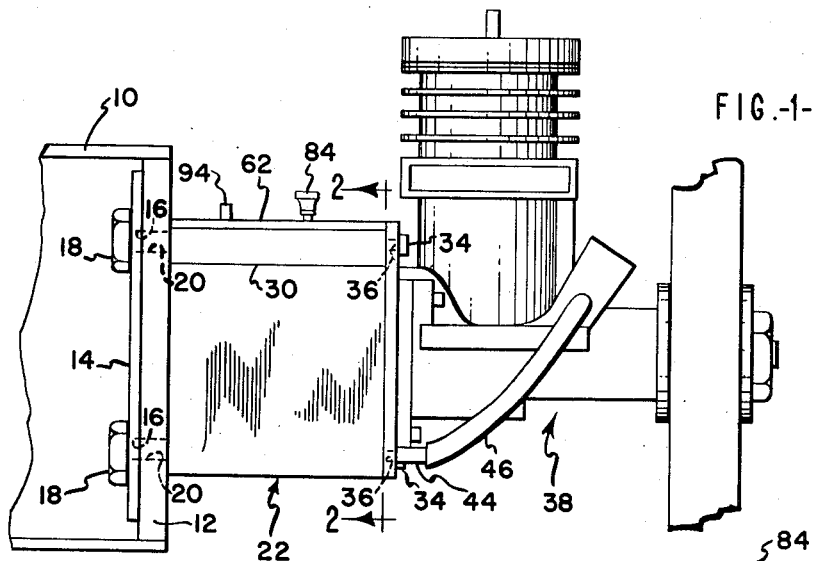
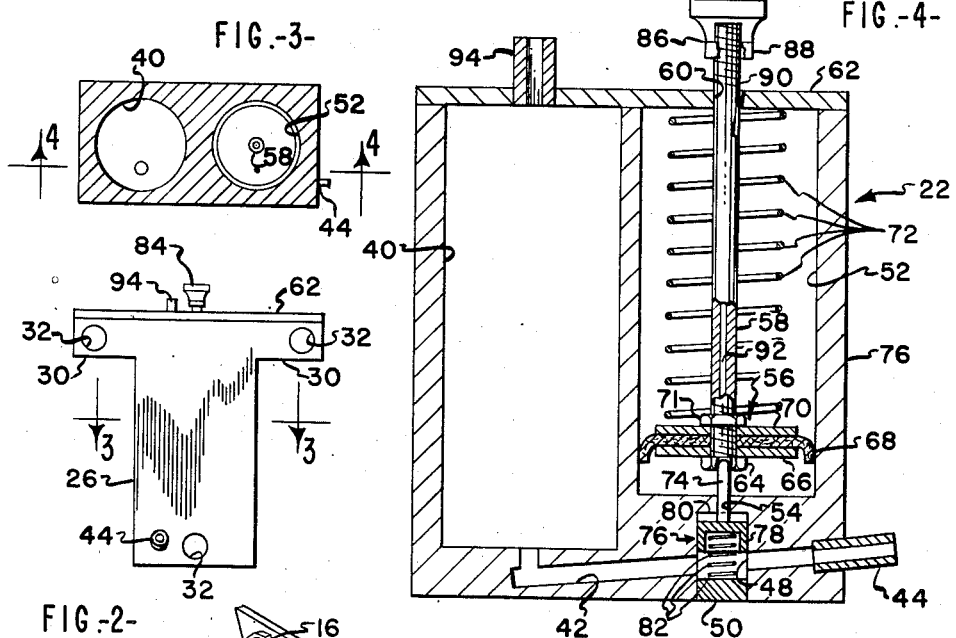
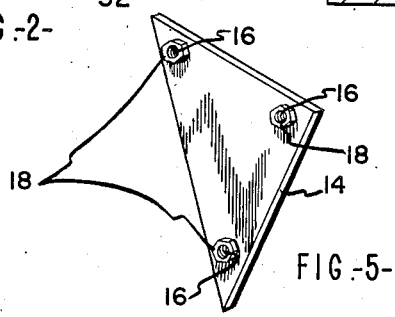
Ray A. Van De Walker
INVENTOR.
BY United States Patent Office 2,788,064
Patented Apr. 9, 1957

2,788,064
MODEL AIRPLANE FUEL TANK CONTROL
Ray A. Van De Walker, Norwalk, Calif.
Application June 13, 1955, Serial No. 514,863
4 Claims. (Cl. 158—36.6)

The present invention relates to new and improved model airplane construction. More specifically, it relates to model airplane construction employing a combined timer and fuel tank as will be described hereinafter.

At the present time, model airplanes are frequently constructed so as to include a fuselage to which there are attached conventional wings, tail members, wheels, and the like. This fuselage includes a front wall commonly termed a fire wall, upon which various types of small internal combustion engines are mounted so as to power the model plane. In the past there has been a considerable problem as to how to satisfactorily govern the operation of such engines so that the time of flight of a model aircraft may be carefully controlled.

It is the object of the present invention to provide a new combined timer and fuel tank for use in governing the time of flight of model aircraft. A further object of the instant invention is to provide a combined timer and fuel tank for model aircraft which is very simple to construct, which is comparatively of light weight, and which is exceedingly satisfactory for the purposes intended. Further objects of this invention as well as many advantages of it will be apparent from the remainder of this disclosure, including the appended claims and drawings, in which:

Fig. 1 is a side view employing the invention;
Fig. 2 is an elevational view taken at line 2—2 of Fig. 1 of the drawings;
Fig. 3 is a cross sectional view taken at line 3—3 of Fig. 2 of the drawings;
Fig. 4 is a cross sectional view taken at line 4—4 of Fig. 3 of the drawings; and
Fig. 5 is an isometric view of a mounting plate employed with the invention.

In all figures of the drawings, like numerals are used to designate like parts. The present invention is not to be considered as being limited to a construction employing the precise dimensions illustrated in the drawings, inasmuch as a wide number of different modifications may be made falling within the scope of this disclosure.

The invention may be briefly summarized as required by the Rules of Practice of the United States Patent Office as being concerned with a construction of a model airplane having a forward fire wall, which construction includes: a mounting plate attached to the forward fire wall; a plurality of internally threaded studs attached to said mounting plate; a combined timer and fuel tank having a plurality of openings formed therein, positioned against said fire wall, said openings being aligned with said studs; an engine positioned against said combined timer and fuel tank, such engine including a plurality of openings formed thereon, said openings being aligned with the openings in said timer and fuel tank and with said studs; and a plurality of bolts passing through said openings in said engine and said combined timer and fuel tank and engaging said studs so as to secure said combined timer and fuel tank and said engine to said fire wall. The combined timer and fuel tank indicated in the preceeding sentence is a combined structure formed out of a single member which may be briefly summarized as including: means defining a fuel tank; means defining a passage leading to the bottom of said fuel tank; valve means located within said passage and timer means for closing said valve means after a predetermined period so as to prevent the flow of fuel in said fuel tank.

The actual invention is best understood with reference to the accompanying drawings. In Fig. 1 of these drawings there is shown part of a fuselage 10 of a model aircraft upon which there is formed a forward fire wall 12. The term "fire wall" used here is perhaps a misnomer inasmuch as it is employed merely to designate a forward wall positioned generally perpendicular to a center line drawn through the fuselage 10. This wall may or may not be fireproof as desired. Secured to the fire wall 12 as by means of screws or the like is a generally triangular mounting plate 14, the construction of which is best seen in Fig. 5 of the drawings. This mounting plate is of generally triangular configuration and is provided with holes 16 around which there are secured internally threaded studs 18. The holes 16 and the studs 18 are preferably aligned with holes 20 formed within the fire wall 12.

Although the mounting plate 14 is shown in Fig. 1 of the drawings as being mounted generally within the fuselage 10 back of the fire wall 12, it can also be positioned directly in front of this fire wall. In the latter case the holes 20 are, of course, omitted.

Positioned directly in front of the fire wall 12 is a combined timer and fuel tank 22 of the invention. This member is preferably formed out of a large block of aluminum or the like, so as to have a center body portion 26 and parallel edge flanges 30. Within the edge flanges 30 and the center body portion 26 there are provided holes 32 which are preferably alined with the studs 18 and the holes 16 and 20 so that three bolts 34 may be passed through openings 36 formed on a model airplane engine 38, and through the holes 32 and 20 into the studs 18, in order to rigidly attach the engine 38 and the combined timer and fuel tank to the fuselage 10. It is readily seen that this construction is very simple and provides a direct means whereby the engine 38 may be conveniently replaced by another engine of different size.

The combined timer and fuel tank 22 has formed therein a first internal cylindrical cavity 40 which serves as a fuel tank. A passage 42 is provided in the center body portion 26 leading from the bottom of this internal cavity 40 generally upwards towards the top of the cavity 40 at an angle substantially as shown in Fig. 4 of the drawings, so that the end of this passage 42 is closer to the top of the combined timer and fuel tank 22 than the portion of this passage directly beneath the internal cavity 40. Preferably a small tube 44 is attached to the center body portion 26 so as to project therefrom in order that passage 42 may be directly connected to the engine 38 by means of a flexible tube 46.

The passage 42 is intersected by a small bore 48 having a plug 50 located at the bottom thereof. This bore 48 is connected to the bottom of an internal cylindrical cavity 52 serving as a timer cylinder by means of a short small passage 54; it is located at an angle to the passage 42. The internal cavity 52 is preferably formed of approximately the same shape as the internal cavity 40. It is designed to hold a plunger 56 which includes a central rod 58 projecting out through an opening 60 in a cover 62. This cover 62 covers the top of the cavity 52 and of the internal cavity 40, and is secured to the block 24 by conventional means such as, for example, screws. The end of the rod 58 within the cavity 52 is threaded so that a nut 64 may be placed upon the end of this rod in order to hold a washer 66 and a flexible diaphragm 68 of leather or the like against another washer 70 secured to the rod 58 by another nut 71. A spring 72 is normally placed between the cover 62 and the washer 70 so as to urge the rod 58 towards the bottom of the cavity 52. Thus, in its normal position, the end of the washer 66 is designed to push against a short rod 74 attached to a valve member 76 located within the bore 48 so as to extend through the passage 54. This valve member 76 includes a lower generally cup-shaped body 78 and a sealing washer 80 of leather or the like, located about the rod 74 within the bore 48. A spring 82 is held within the interior of the body 78 so as to normally bias this body away from the block 50 towards the cavity 52.

The end of the rod 58 on the side of the cover 62 remote from the cavity 52 is provided with a conventional knurled knob 84 which engages threads 86 formed upon this end of the rod 58. A lock washer 88 is preferably also located upon the threads 86 so that the position of the knob 84 upon the rod 58 may be adjusted to a given fixed position in order to regulate the compression of the spring 72.

In order that the rod 58 may be moved into and out of cavity 52 it is necessary to incorporate means whereby air may move into and out of both ends of this cavity. As best seen in Fig. 4 of the drawings, part of such means comprises a flat surface 90 formed on the rod 58 adjacent to the threads 68. With this construction the flat surface projects a short distance into the top of the cavity 52 so that air can move into and out of the top of this cavity. This flat surface also serves to convey air to the bottom of the cavity 52 through a passage 92 located in the center of rod 58. Thus, with this construction air entering or leaving the bottom of the cavity 52 goes through the passage 92 into the knurled knob 84, around the end of the rod 58, and thence out between the flat surface 90 and the adjacent threads on this knurled knob and the threads on the lock washer 88.

The operation of the combined timer and fuel tank herein described is exceedingly simple. In use, fuel is introduced in the cavity 40 through a tube 94 in the cover 62. In order to regulate the length of time the engine will operate the knob 84 is pulled upwards. As this occurs, the washer 66 is withdrawn from the rod 74 and the spring 82 causes the valve body 78 to move upwards allowing fuel to flow through the bore 48. As the engine 38 is started, this fuel is drawn through the passage 42, past the bore 48 to the engine itself.

Gradually the spring 72 will force the rod 58 back to its initial position. As this occurs the end of the washer 66 will hit against the rod 74 causing the valve body 78 to move downwards against the pressure of the spring 82. As this occurs the valve body first cuts off fuel flow from the bore 48 through the passage 42 to the engine 38. As further movement of the valve body 78 occurs, fuel entrapped within the bore 48 is forced back through the passage 42 to the cavity 40. Thus, because of the slanting configuration of the passage 42, there is no danger of the valve body 78 failing to move because of fuel being trapped within the bore 48. The washer 80 previously described merely serves to prevent fuel from escaping from the bore 48 into the cavity 52 so as to interfere with the operation of the plunger 56. Essentially, the washer 66, the diaphragm 68 and the washer 70 serve as a conventional piston within the cavity 52. If desired, other equivalent means can be employed with the invention.

Those skilled in the art will realize that the present invention marks a substantial improvement over the prior related devices. Only one small flexible hose or tubing is required to connect the fuel tank, the timer, and the engine employed. Because of this fact, there is much less danger of leakage than is involved with the prior related constructions.

The combined timer and fuel tank herein specified is a substantial improvement over the prior related devices since this mechanism may be conveniently manufactured from a single block of aluminum or the like, utilizing merely a conventional drill press and related equipment. Other advantages of the structure herein set forth will, of course, be apparent to those skilled in the art. Because of the fact that a number of minor modifications may be made in this invention without departing from the essential features of the invention, the invention itself is to be considered to be limited only by the appended claims forming a part of this description.

I claim:

1. A combined timer and fuel tank for model airplanes which comprises: a member; means defining a fuel tank having a bottom within said member; means defining a passage within said member leading from said bottom of said fuel tank to the exterior of said member; means defining a bore within said member, said bore intersecting said passage; means defining a timer cylinder in said member adjacent to said fuel tank and said bore; means defining a small passage in said member connecting said bore and the bottom of said timer cylinder; a valve body positioned within said bore; spring means biased so as to hold said valve body so as to permit fluid flow through said passage leading from said fuel tank; a rod attached to said valve body so as to project through said small passage; piston means located within said timer cylinder; spring means located within said timer cylinder normally urging said piston means against said rod so as to push said rod and said valve body in order to move said valve body within said bore so as to prevent fluid flow through said bore; means for withdrawing said piston means from said rod against said second spring means within said timer cylinder; and means permitting air flow into the ends of said timer cylinder.

2. A combined timer and fuel tank for model airplanes as defined in claim 1 wherein: said bore is located at an angle to said passage.

3. A combined timer and fuel tank for model aircraft as defined in claim 1 including: a sealing washer disposed about said rod to prevent fuel from entering said timer cylinder from said bore.

4. A combined timer and fuel tank for model aircraft which comprises: a member; means defining a fuel tank in said member, said fuel tank having a bottom; means defining a passage within said member leading from said bottom of said fuel tank to the exterior of said member; means defining a bore within said member, said bore being located at an angle to said passage and intersecting said passage; means defining a timer cylinder in said member adjacent to said fuel tank and said bore; means defining a small passage in said member connecting said bore to the bottom of said timer cylinder; a valve body positioned within said bore; spring means located in said bore, said spring means being biased so as to hold said valve body away from said passage leading from said fuel tank; a rod attached to said valve body so as to project through said small passage; a sealing washer positioned within said bore around said rod; a piston including a flexible diaphragm engaging the walls of said timer cylinder positioned within said timer cylinder; spring means located within said timer cylinder so as to normally urge said piston means against said rod so as to push said rod and said valve body in order to move said valve body within said bore so as to prevent fluid flowing through said bore; a rod attached to said piston means so as to project therefrom out of said timer cylinder; and means permitting air flow into the ends of said timer cylinder.

References Cited in the file of this patent

UNITED STATES PATENTS

| 1,148,922 | Pagano | Aug. 3, 1915 |
| 2,207,189 | Austin et al. | July 9, 1940 |
| 2,234,758 | Goldberg | Mar. 11, 1941 |
| 2,576,555 | Atwood et al. | Nov. 27, 1951 |

FOREIGN PATENTS

| 40,826 | Switzerland | May 27, 1907 |